United States Patent [19]

Bonevento et al.

[11] Patent Number: 5,265,255
[45] Date of Patent: Nov. 23, 1993

[54] PERSONAL COMPUTER SYSTEM WITH INTERRUPT CONTROLLER

[75] Inventors: Francis M. Bonevento, Boca Raton; Ernest N. Mandese, Boynton Beach; Richard N. Mendelson, Highland Beach, all of Fla.

[73] Assignee: International Business Machines Corp., Armonk, N.Y.

[21] Appl. No.: 586,662

[22] Filed: Sep. 24, 1990

[51] Int. Cl.⁵ .................. 364 DIG. 1; 364 230.2; 364 230.4; 364 231.4; 364 231.5; G06F 13/10; G06F 13/24; G06F 13/36

[52] U.S. Cl. .................................................. 395/725

[58] Field of Search ............... 364/200, 900, DIG. 1, 364/DIG. 2; 395/725, 325, 550

[56] References Cited

U.S. PATENT DOCUMENTS

| | | | |
|---|---|---|---|
| 4,004,283 | 1/1977 | Bennett et al. | 395/725 |
| 4,099,255 | 7/1978 | Stanley et al. | 395/725 |
| 4,302,808 | 11/1981 | Zanchi et al. | 395/325 |
| 4,375,639 | 3/1983 | Johnson, Jr. | 395/325 |
| 4,420,806 | 12/1983 | Johnson, Jr. et al. | 395/725 |
| 4,470,111 | 9/1984 | Jenkins et al. | 395/275 |
| 4,495,569 | 1/1985 | Kagawa | 395/725 |
| 4,499,537 | 2/1985 | Eckert et al. | 395/725 |
| 4,626,987 | 12/1986 | Renninger | 395/725 |
| 4,716,523 | 12/1987 | Burrus, Jr. et al. | 395/725 |
| 4,761,732 | 8/1988 | Eldumiati et al. | 395/725 |
| 4,768,149 | 8/1988 | Konopik et al. | 395/275 |
| 4,799,148 | 1/1989 | Nishioka | 395/725 |
| 4,807,117 | 2/1989 | Itokn et al. | 395/725 |
| 4,930,068 | 5/1990 | Katayose et al. | 395/725 |
| 4,930,070 | 5/1990 | Yonekura et al. | 395/725 |
| 5,045,998 | 9/1991 | Begun et al. | 395/325 |
| 5,072,363 | 12/1991 | Gallagher | 395/725 |
| 5,159,684 | 10/1992 | Kroll et al. | 395/500 |

FOREIGN PATENT DOCUMENTS 3142452 6/1988 Japan.

OTHER PUBLICATIONS

Kenneth L. Short "Microprocessors and programmed Logic" 1981 p. 297.

Primary Examiner—Michael R. Fleming
Assistant Examiner—Ayaz R. Sheikh
Attorney, Agent, or Firm—Daniel E. McConnell

[57] ABSTRACT

This disclosure relates to personal computer systems, and more particularly to a personal computer which provides for interrupt redirection of the activity of a microprocessor. The personal computer system has a multichannel bus for transferring data, a microprocessor for manipulating data and coupled to the bus, and a plurality of input/output devices coupled to the bus for receiving and delivering data for manipulation by the microprocessor. Each input/output device is capable of generating a logical interrupt signal indicative of a request for access to the microprocessor and of being remotely reset to a non-interrupt condition, and all of the devices deliver their logical interrupt signals through a common physical channel of the bus. An interrupt controller is coupled to the microprocessor and bus for recognizing delivery of an interrupt signal and for periodically generating an interrupt reset signal and delivering reset signals to all of the input/output devices simultaneously for setting all of the devices to a condition indicative of no request for access to said microprocessor.

11 Claims, 3 Drawing Sheets

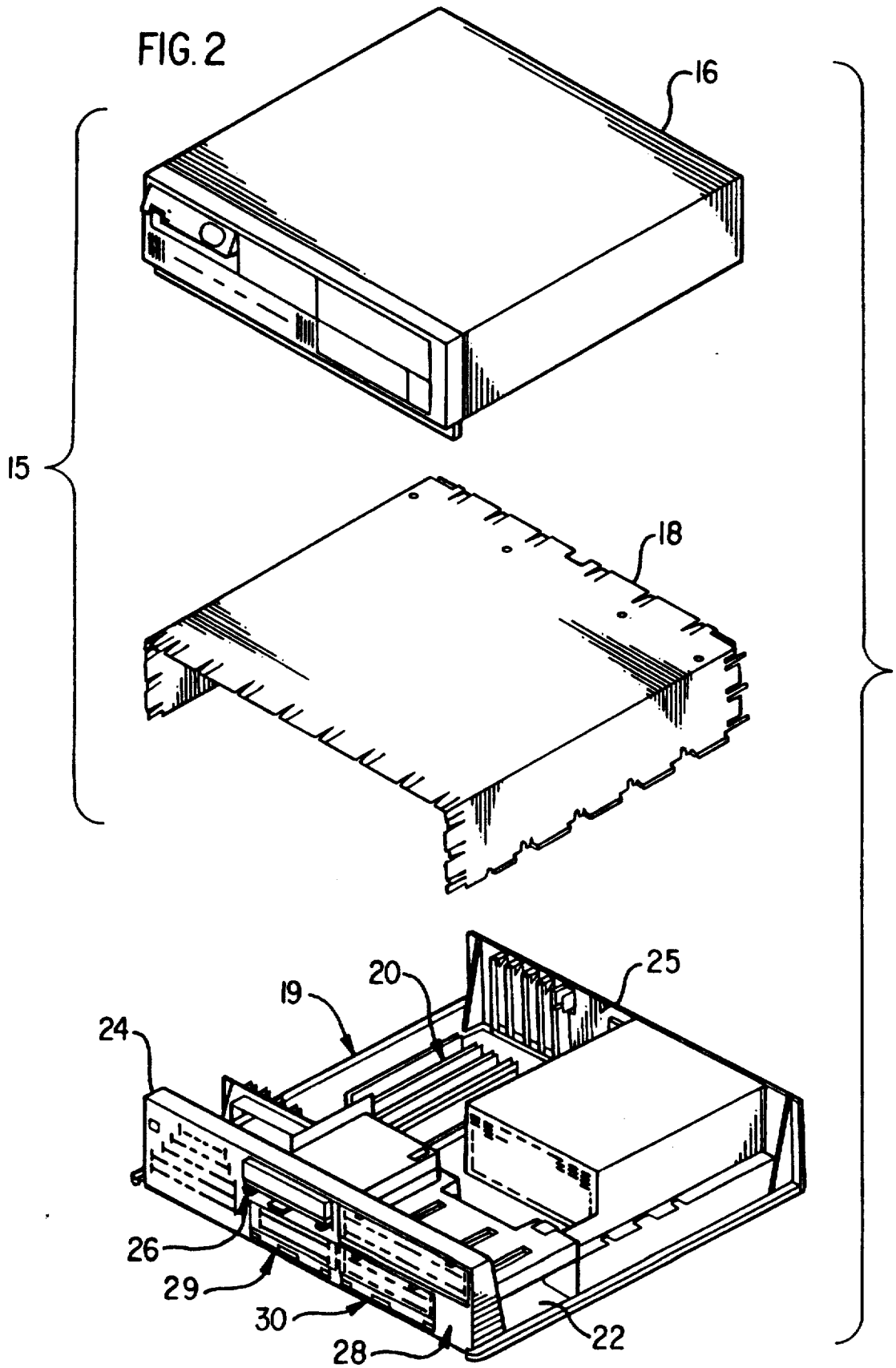

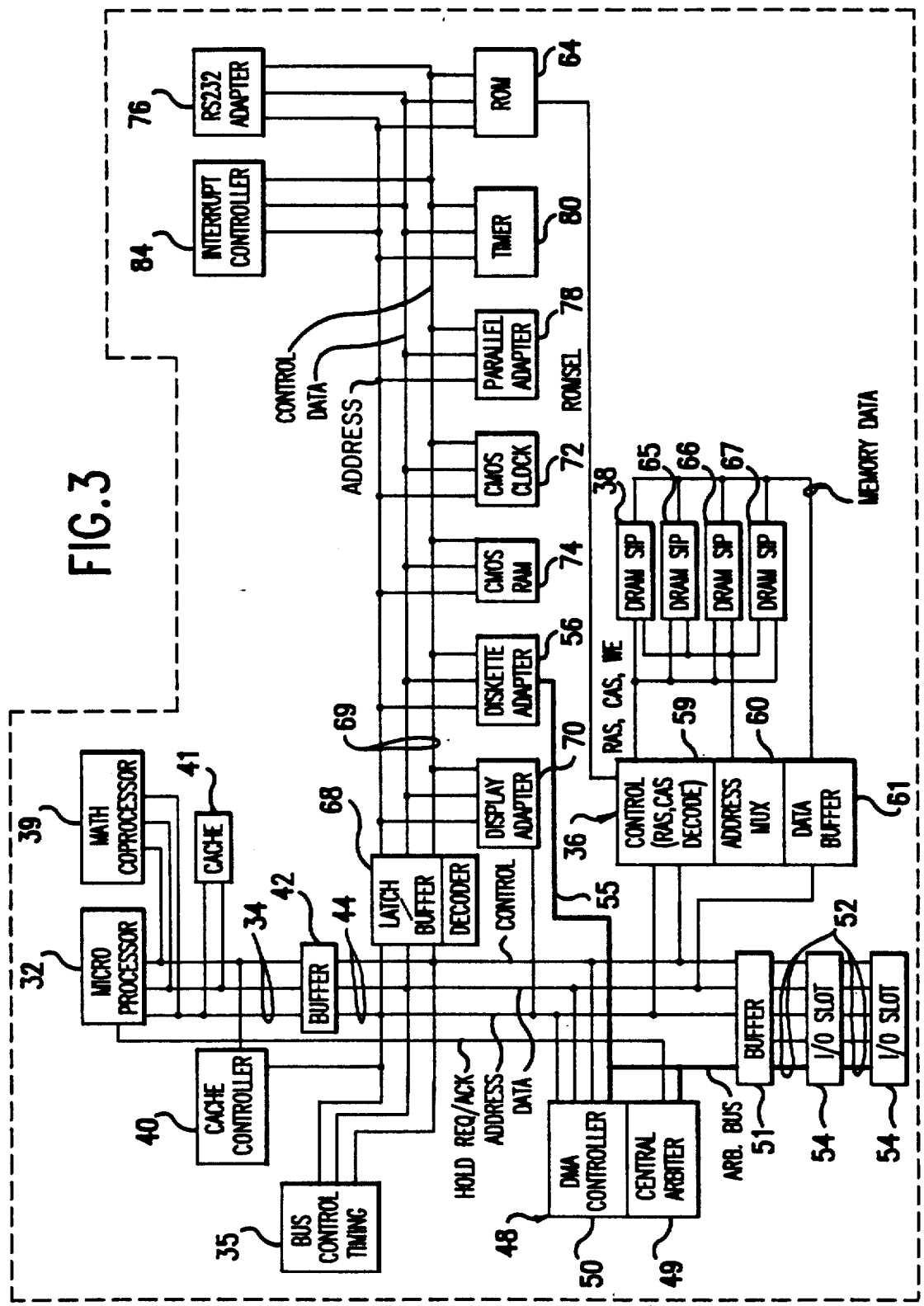

PERSONAL COMPUTER SYSTEM WITH INTERRUPT CONTROLLER

TECHNICAL FIELD

This disclosure relates to personal computers, and more particularly to a personal computer which provides for interrupt redirection of the activity of a microprocessor.

BACKGROUND OF THE INVENTION

Personal computer systems in general and IBM personal computers in particular have attained widespread use for providing computer power to many segments of today's modern society. Personal computer systems can usually be defined as a desk top, floor standing, or portable microcomputer that consists of a system unit having a single system processor and associated volatile and non-volatile memory, a display monitor, a keyboard, one or more diskette drives, a fixed disk storage, and an optional printer. One of the distinguishing characteristics of these systems is the use of a motherboard or system planar to electrically connect these components together. These systems are designed primarily to give independent computing power to a single user and are inexpensively priced for purchase by individuals or small businesses. Examples of such personal computer systems are IBM's PERSONAL COMPUTER AT and IBM's PERSONAL SYSTEM/2 Models 25, 30, 50, 60, 70 and 80.

These systems can be classified into two general families. The first family, usually referred to as Family I Models, uses an expansion bus architecture exemplified by the IBM PERSONAL COMPUTER AT and other "IBM compatible" machines. The second family, referred to as Family II Models, uses IBM's MICRO CHANNEL expansion bus architecture exemplified by IBM's PERSONAL SYSTEM/2 Models 50 through 80. The Family I models typically have used the popular Intel Corporation 8088 or 8086 microprocessor as the system processor. These processors have the ability to address one megabyte of memory. The Family II models typically use the high speed Intel Corporation 80286, 80386, and 80486 microprocessors which can operate in a real mode to emulate the slower speed Intel Corporation 8086 microprocessor or a protected mode which extends the addressing range from 1 megabyte to 4 Gigabytes for some models. In essence, the real mode feature of the 80286, 80386, and 80486 processors provides hardware compatibility with software written for the 8086 and 8088 microprocessors.

In both Families, the expansion bus has a straightforward purpose—enabling the use of option or expansion cards or boards to add features or options and expand the usefulness of the system. As expansion bus architectures have developed, provision has been made for a number of functions to be served by the multiple channels provided. These functions have included data read and write commands issued by the microprocessor, direct memory access commands for moving data, and interrupt requests by which various devices may capture the attention of the microprocessor and divert it to another task. In the handling of interrupt requests, the microprocessor becomes a server and other devices connected with the bus become clients. In order to attain high system throughput, it is desirable for the system to detect, service and reset interrupt signals as promptly as feasible. Thus there are three areas of interrupt signal handling which can be addressed in optimizing system performance, namely the detection, servicing and resetting of interrupt signals impinging on the microprocessor. Prior to the present invention, interrupt handling has been essentially seriatim, opening the probability that throughput may be severely impaired by the occurrence of a large number of logical interrupts which require resetting by successive addressing of a plurality of devices which deliver such logical interrupts through a single interrupt pathway or a limited small number of such pathways. This impairment becomes particularly serious with an architecture in which control over data buses is shared among a plurality of devices, each of which may take control of the data bus. Such devices are known as "bus masters".

BRIEF DESCRIPTION OF THE INVENTION

Having the above discussion in mind, it is an object of the present invention to improve the handling of interrupt signals in a personal computer system of the general type described above. In realizing this object of the present invention, a capability is provided for resetting a plurality of logical interrupts to a non-interrupt signalled state with a single reset signal.

Another object of this invention is to enhance the operation of a personal computer system in which control over the expansion bus is shared among a number of bus master devices, any one of which may request control of the bus from the system microprocessor. In realizing this object of the present invention, an interrupt controller may function to reset a plurality of bus master devices with a single reset signal.

BRIEF DESCRIPTION OF THE DRAWINGS

Some of the objects of the invention having been stated, other objects will appear as the description proceeds, when taken in connection with the accompanying drawings, in which:

FIG. 2 is an exploded perspective view of certain elements of the personal computer of FIG. 1 including a chassis, a cover, an electromechanical direct access storage device and a planar board and illustrating certain relationships among those elements; and FIG. 3 is a schematic view of certain components of the personal computer of FIGS. 1 and 2.

DETAILED DESCRIPTION OF INVENTION

Figure 1:
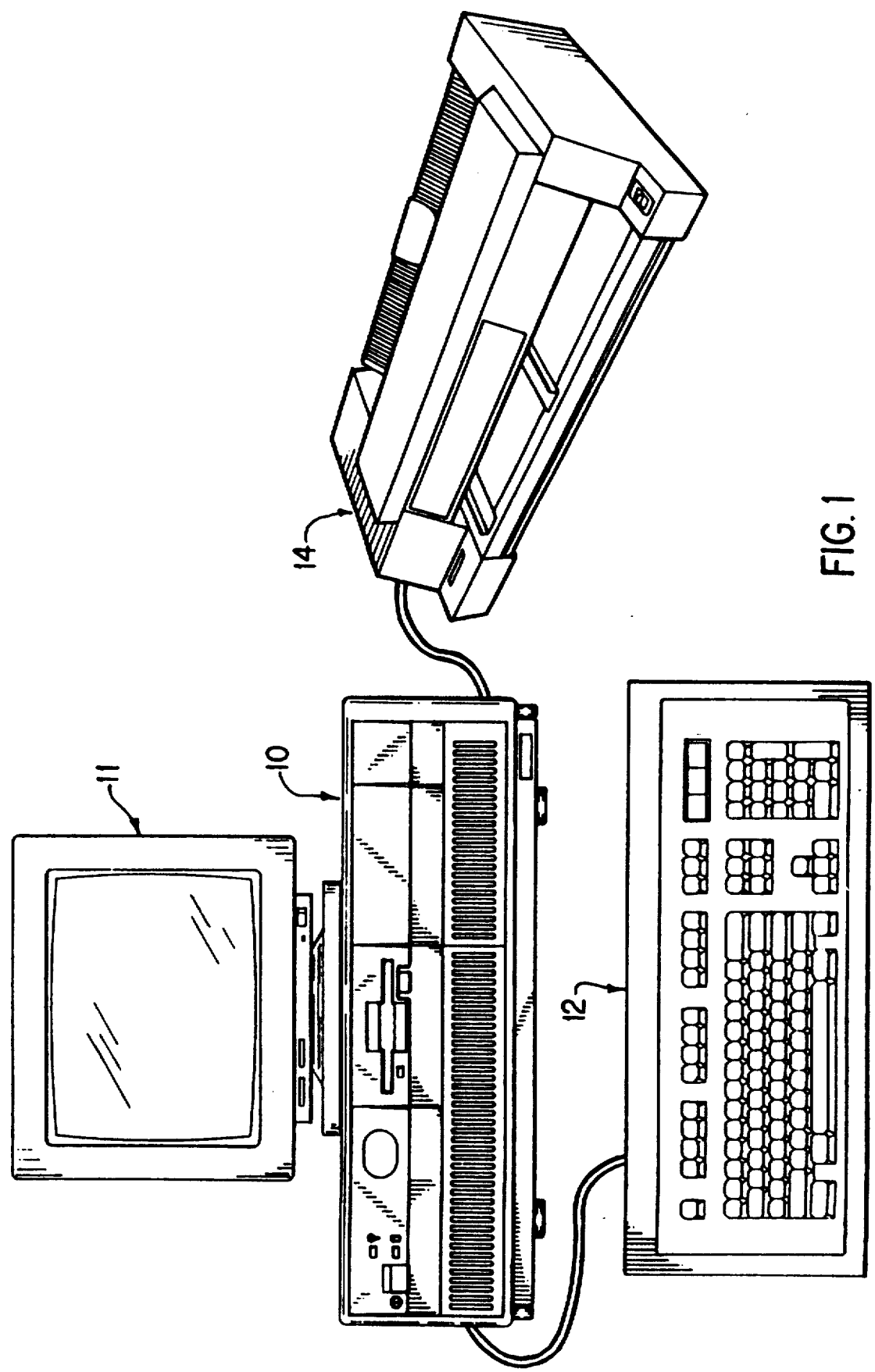
FIG. 1 is a perspective view of a personal computer embodying this invention.

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention.

Referring now more particularly to the accompanying drawings, a microcomputer embodying the present invention is there shown and generally indicated at 10 (FIG. 1). As mentioned hereinabove, the computer 10 may have an associated monitor 11, keyboard 12 and printer or plotter 14. The computer 10 has a cover 15 formed by a decorative outer member 16 (FIG. 2) and an inner shield member 18 which cooperate with a chassis 19 in defining an enclosed, shielded volume for receiving electrically powered data processing and storage components for processing and storing digital data. At least certain of these components are mounted on a multilayer planar 20 or motherboard which is mounted on the chassis 19 and provides a means for electrically interconnecting the components of the computer 10 including those identified above and such other associated elements as floppy disk drives, various forms of direct access storage devices, accessory cards or boards, and the like. As pointed out more fully hereinafter, provisions are made in the planar 20 for the passage of input/output signals to and from the operating components of the microcomputer.

The chassis 19 has a base indicated at 22, a front panel indicated at 24, and a rear panel indicated at 25 (FIG. 2). The front panel 24 defines at least one open bay (and in the form illustrated, four bays) for receiving a data storage device such as a disk drive for magnetic or optical disks, a tape backup drive, or the like. In the illustrated form, a pair of upper bays 26, 28 and a pair of lower bays 29, 30 are provided. One of the upper bays 26 is adapted to receive peripheral drives of a first size (such as those known as 3.5 inch drives) while the other 28 is adapted to receive drives of a selected one of two sizes (such as 3.5 and 5.25 inch) and the lower bays are adapted to receive devices of only one size (3.5 inch). One floppy disk drive is indicated at 80 in FIG. 1, and is a removable media direct access storage device capable of receiving a diskette inserted thereinto and using the diskette to receive, store and deliver data as is generally known.

Prior to relating the above structure to the present invention, a summary of the operation in general of the personal computer system 10 may merit review. Referring to FIG. 3, there is shown a block diagram of a personal computer system illustrating the various components of the computer system such as the system 10 in accordance with the present invention, including components mounted on the planar 20 and the connection of the planar to the I/O slots and other hardware of the personal computer system. Connected to the planar is the system processor 32 comprised of a microprocessor which is connected by a high speed CPU local bus 34 through a bus control timing unit 35 to a memory control unit 36 which is further connected to a volatile random access memory (RAM) 38. While any appropriate microprocessor can be used, one suitable microprocessor is the 80386 which is sold by Intel Corporation .

While the present invention is described hereinafter with particular reference to the system block diagram of FIG. 3, it is to be understood at the outset of the description which follows that it is contemplated that the apparatus and methods in accordance with the present invention may be used with other hardware configurations of the planar board. For example, the system processor could be an Intel 80286 or 80486 microprocessor.

Returning now to FIG. 3, the CPU local bus 34 (comprising data, address and control components) provides for the connection of the microprocessor 32, a math coprocessor 39, a cache controller 40, and a cache memory 41. Also coupled on the CPU local bus 34 is a buffer 42. The buffer 42 is itself connected to a slower speed (compared to the CPU local bus) system bus 44, also comprising address, data and control components. The system bus 44 extends between the buffer 42 and a further buffer 68. The system bus 44 is further connected to a bus control and timing unit 35 and a DMA unit 48. The DMA unit 48 is comprised of a central arbitration unit 49 and DMA controller 50. The buffer 51 provides an interface between the system bus 44 and an optional feature bus such as the MICRO CHANNEL bus 52. Connected to the bus 52 are a plurality of I/O slots 54 for receiving MICRO CHANNEL adapter cards which may be further connected to an I/O device or memory. The adapter cards may include one or more cards of the type known as bus master cards, each of which may request of the system control over the bus 52, and each of which may thereby control exchange of data with one or more slave devices. The slave devices associated with bus master cards may be memory slaves providing essentially only memory capabilities for use within the system or I/O slaves providing capabilities for exchange of information and data externally of the system. By way of example only, a bus master card may be a small computer systems interface (SCSI) card giving access to a chain of non-removable or removable media direct access storage devices such as fixed disk or hard drives, optical storage drives, etc.

An arbitration control bus 55 couples the DMA controller 50 and central arbitration unit 49 to the I/O slots 54 and a diskette adapter 56. Also connected to the system bus 44 is a memory control unit 36 which is comprised of a memory controller 59, an address multiplexor 60, and a data buffer 61. The memory control unit 36 is further connected to a random access memory as represented by the RAM module 38. The memory controller 36 includes the logic for mapping addresses to and from the microprocessor 32 to particular areas of RAM 38. This logic is used to reclaim RAM previously occupied by BIOS. Further generated by memory controller 36 is a ROM select signal (ROMSEL), that is used to enable or disable ROM 64.

While the microcomputer system 10 is shown with a basic 1 megabyte RAM module, it is understood that additional memory can be interconnected as represented in FIG. 3 by the optional memory modules 65 through 67. For purposes of illustration only, the present invention is described with reference to the basic one megabyte memory module 38.

A latch buffer 68 is coupled between the system bus 44 and a planar I/O bus 69. The planar I/O bus 69 includes address, data, and control components respectively. Coupled along the planar I/O bus 69 are a variety of I/O adapters and other components such as the display adapter 70 (which is used to drive the monitor 11), a CMOS clock 72, nonvolatile CMOS RAM 74 herein after referred to as NVRAM, a RS232 adapter 76, a parallel adapter 78, a plurality of timers 80, a diskette adapter 56, an interrupt controller 84, and a read only memory 64. The read only memory 64 includes the BIOS that is used to interface between the I/O devices and the operating system of the microprocessor 32. BIOS stored in ROM 64 can be copied into RAM 38 to decrease the execution time of BIOS. ROM 64 is further responsive (via ROMSEL signal) to memory controller 36. If ROM 64 is enabled by memory controller 36, BIOS is executed out of ROM. If ROM 64 is disabled by memory controller 36, ROM is not responsive to address enquiries from the microprocessor 32 (i.e. BIOS is executed out of RAM).

The clock 72 is used for time of day calculations and the NVRAM is used to store system configuration data.

That is, the NVRAM will contain values which describe the present configuration of the system. For example, NVRAM contains information describing the capacity of a fixed disk or diskette, the type of display, the amount of memory, time, date, etc. Of particular importance NVRAM will contain data (can be one bit) which is used by memory controller 36 to determine whether BIOS is run out of ROM or RAM and whether to reclaim RAM intended to be used by BIOS RAM. Furthermore, these data are stored in NVRAM whenever a special configuration program, such as SET Configuration, is executed. The purpose of the SET Configuration program is to store values characterizing the configuration of the system to NVRAM.

As mentioned hereinabove, the computer has a cover indicated generally at 15 which cooperates with the chassis 19 in forming an enclosed, shielded volume for containing the above identified components of the microcomputer. The cover preferably is formed with an outer decorative cover member 16 which is a unitary molded component made of a moldable synthetic material and a metallic thin sheet liner 18 formed to conform to the configuration of the decorative cover member. However, the cover can be made in other known ways and the utility of this invention is not limited to enclosures of the type described.

As discussed hereinabove, the computer 10 has a plurality of input/output devices such as the diskette adapter 56 coupled to the bus for receiving and delivering data for manipulation by the microprocessor 32. In accordance with this invention, each such device is capable of generating a logical interrupt signal indicative of a request for access to the microprocessor 32 and of being remotely reset to a non-interrupt condition, and all of such a plurality of devices deliver logical interrupt signals generated thereby through a common physical channel or conductive pathway of the bus. This gives rise to a distinction between logical interrupts (generated and possibly stored at each of a plurality of devices) and physical interrupts, with the latter being the appearance of a signal on the corresponding conductive pathway. There may be a plurality of logical interrupts behind a single physical interrupt.

The latter point is particularly true where one or more of the devices is of the type known as a "bus master". A bus master device is one which may take command of a data bus and direct transfer of data over or through the bus until such time as control is relinquished. Many bus master devices serve in essence as servers for a plurality of clients. Some such devices, as contemplated by this invention, have one or more registers in which a count of logical interrupts is accumulated, with the busmaster device functioning to successively present interrupts on the physical interrupt channel which have originated as logical interrupts from a plurality of client devices.

The interrupt controller 84, in accordance with this invention, is coupled to the microprocessor 32 and the bus for recognizing delivery of an interrupt signal through the common channel and for periodically generating an interrupt reset signal and delivering reset signals to one or more of a plurality of input/output devices for setting such devices to a condition indicative of no request for access to the microprocessor. Stated differently, the interrupt controller may issue a reset signal which, when received by those devices which contribute to a physical interrupt on a particular channel, will reset the interrupt state of one or all such devices and clear the interrupt channel of all interrupts on issuance of a single command. This is to be distinguished from prior practice in which any reset command issued would be addressed to a specific device, leaving others using the same channel to continue the presence of a physical interrupt on that channel.

As will be appreciated by the thoughtful reader, clearing all logical interrupts accumulated in the register of a single bus master device or on a particular physical interrupt channel with the issuance of a single command contributes to optimizing interrupt resetting, thereby realizing the stated objects of this invention.

As mentioned, the present invention contemplates that at least one of the input/output devices connected with the bus is a bus master device capable of requesting and exercising control over the bus, such as a SCSI controller mentioned hereinabove. Further, the computer system in such instances will further comprise one or more slave device(s) capable of sending and receiving data under the control of the bus master device. A slave device may be a memory slave device for providing memory capability subject to the control of the bus master device, or may be an input/output slave device for providing input/output capability subject to the control of the bus master device. Such input/output capability may, for example only, be a special imaging display or capture capability such as may be related to video images.

It is contemplated by this invention that at least one of the input/output devices attached to a bus, such as a bus master device as mentioned hereinabove, has an interrupt register capable of storing a count of pending, uncleared, interrupts. Interrupt requests, in such an environment, will be successively supplied to the microprocessor by generating an interrupt request to the interrupt controller 84 when the pending count of uncleared interrupts is greater than zero. A single reset interrupt command to the device will reset the interrupt count and cause withdrawal of the interrupt request when the interrupt count is equal to or less than zero. In particular, the presently disclosed invention is so used with an architecture known as the subsystem control block (SCB) architecture, in which a bus master I/O device may indicate that a number of previous commands have been completed by presenting a single physical interrupt to the microprocessor. The indication of the logical interrupt is contained in a control block held in a register and associated with each command. Rather than using a succession of multiple commands to signal to the device that the microprocessor has processed each logical interrupt, a single command is used to reset multiple logical interrupts. This optimizes the usage of the bus and frees it so that other devices may gain access, while also freeing the interrupt controller so that it may be used to transmit interrupt requests from other devices in a shorter time interval than might otherwise be the case. As will be understood, an input/output device or bus master capable of functioning as a server to a plurality of clients may successively take mastery of the bus for a succession of clients. At the same time, the interrupt controller may regain mastery of the bus in the event that the server device otherwise places excessive demands on bus control. Such an ability to reset, with a single command, arbitration amongst a plurality of client devices all competing for access to a bus is believed to be a significant advantage of the present invention. Preferably, this capability is exercised by directing the single command to a selected single busmaster device for resetting interrupts generated by the client devices of that bus master device.

This invention further extends to delivering an interrupt reset signal which is capable of setting an interrupt register to a condition indicative of a negative number of stored logical interrupt signals in an environment such as that disclosed. Such a capability may serve to assure a certain interval of time between the resetting of interrupt signals from a group of associated devices and the reassertion of requests for control over the bus and/or microprocessor.

In the context of the subsystem control block architecture mentioned above, a control block comprises a digital signal having a predetermined number of bits, such as thirty two. The signal is divided into components, each having defined bit numbers within the signal. By way of example only, a thirty two bit signal may have an initial eight bits which identify the signal as a command, four bits which give the number of logical interrupts by which an interrupt register is to be decremented, a reserved bit not used by the reset command, two bits which may be used to enable or disable the interrupt capability of the device(s) to which the command is directed or which disable interrupts after the command is executed, and a remainder of bits which are ignored as not used in the reset command. Such a command normally will be loaded into a command register and held there pending issuance of a signal through an attention register which will identify the specific device instructed to access the command register and receive the command being issued.

In the drawings and specifications there has been set forth a preferred embodiment of the invention and, although specific terms are used, the description thus given uses terminology in a generic and descriptive sense only and not for purposes of limitation.

What is claimed is:

1. A personal computer system comprising:
a multichannel bus for transferring data;
a microprocessor for manipulating data and coupled to said bus;
a plurality of input/output devices coupled to said bus for receiving and delivering data for manipulation by said microprocessor, each said device being capable of generating a logical interrupt signal indicative of a request for access to said microprocessor and of being remotely reset to a non-interrupt condition, and all of said plurality of devices delivering logical interrupt signals generated thereby through a common physical channel of said bus; and
an interrupt controller coupled to said microprocessor and to said bus for recognizing delivery of an interrupt signal through said common physical channel of said bus and for periodically generating an interrupt reset signal and delivering reset signals to all of said plurality of input/output devices simultaneously for setting all of said devices to a condition indicative of no request for access to said microprocessor.

2. A personal computer system according to claim 1 wherein at least one of said input/output devices is a bus master device capable of requesting and exercising control over said bus, and further comprising a slave device capable of sending and receiving data under the control of said bus master device.

3. A personal computer system according to claim 2 wherein said slave device is a memory slave device for providing memory capability subject to the control of said bus master device.

4. A personal computer system according to claim 2 wherein said slave device is an input/output slave device for providing input/output capability subject to the control of said bus master device.

5. A personal computer system according to claim 1 wherein at least one of said input/output devices has an interrupt register capable of storing a plurality of logical interrupt signals for successively signalling requests for access to said microprocessor and further wherein said interrupt controller in delivering an interrupt reset signal is capable of setting said interrupt register to a condition indicative of an absence of stored logical interrupt signals.

6. A personal computer system according to claim 1 wherein at least one of said input/output devices has an interrupt register capable of storing a plurality of logical interrupt signals for successively signalling requests for access to said microprocessor and further wherein said interrupt controller in delivering an interrupt reset signal is capable of setting said interrupt register to a condition indicative of a negative number of stored logical interrupt signals.

7. A personal computer system comprising:
a multichannel bus for transferring data, certain channels of said bus defining a high speed data bus and other channels of said bus defining a slower speed data bus;
a high speed microprocessor having a real and protected mode of operation and being coupled to said high speed data bus;
volatile memory coupled to said high speed data bus;
non-volatile memory coupled to said slower speed data bus;
a bus controller for providing communications between said high speed data bus and said slower speed data bus;
a memory controller coupled to sad volatile memory and said non-volatile memory, said memory controller regulating communications between said volatile memory and said high speed microprocessor;
a plurality of bus master devices coupled to said bus for exchanging data with said microprocessor and said memory, each said device being capable of generating a logical interrupt signal indicative of a request for control of said bus and access to said microprocessor and memory, each said device capable of being remotely reset to a non-interrupt condition, and all of said plurality of devices delivering logical interrupt signals generated thereby through a common physical channel of said bus; and
an interrupt controller coupled to said microprocessor and to said bus for recognizing delivery of an interrupt signal through said common physical channel of said bus and for periodically generating an interrupt reset signal and delivering reset signals to all of said plurality of bus master devices simultaneously for setting all of said devices to a condition indicative of no request for control of said bus.

8. A personal computer system according to claim 7 wherein at least one of said bus master devices has an interrupt register capable of storing a plurality of logical interrupt signals for successively signalling requests for control of said bus and further wherein said interrupt controller in delivering an interrupt reset signal is capable of setting said interrupt register to a condition indicative of an absence of stored logical interrupt signals.

9. A personal computer system according to claim 7 wherein at least one of said bus master devices has an interrupt register capable of storing a plurality of logical interrupt signals for successively signalling requests for control of said bus and further wherein said interrupt controller in delivering an interrupt reset signal is capable of setting said interrupt register to a condition indicative of a negative number of stored logical interrupt signals.

10. A personal computer system comprising:

a multichannel bus for transferring data;

a microprocessor for manipulating data and coupled to said bus;

a plurality of input/output devices coupled to said bus for receiving and delivering data for manipulation by said microprocessor, each said device being capable of generating a logical interrupt signal indicative of a request for access to said microprocessor and of being remotely reset to a non-interrupt condition, at least one of said devices being a bus master device capable of requesting and exercising control over said bus, at least one other of said devices being a slave device capable of sending and receiving data under the control of said bus master device, at least one of said devices having an interrupt register capable of storing a plurality of logical interrupt signals for successively signalling requests for access to said microprocessor, and all of said plurality of devices delivering logical interrupt signals generated thereby through a common physical channel of said bus; and an interrupt controller coupled to said microprocessor and to said bus for recognizing delivery of an interrupt signal through said common physical channel of said bus and for periodically generating an interrupt reset signal and delivering reset signals to all of said plurality of input/output devices simultaneously for setting all of said devices to a condition indicative of no request for access to said microprocessor, said interrupt controller in delivering an interrupt reset signal being capable of setting said interrupt register to a condition indicative of a negative number of stored logical interrupt signals.

11. A personal computer system comprising:

a multichannel bus for transferring data, certain channels of said bus defining a high speed data bus and other channels of said bus defining a slower speed data bus;

a high speed microprocessor having a real and protected mode of operation and being coupled to said high speed data bus;

volatile memory coupled to said high speed data bus;

non-volatile memory coupled to said slower speed data bus;

a bus controller for providing communications between said high speed data bus and said slower speed data bus;

a memory controller coupled to said volatile memory and said non-volatile memory, said memory controller regulating communications between said volatile memory and said high speed microprocessor;

a plurality of bus master devices coupled to said bus for exchanging data with said microprocessor and said memory, each said device having an interrupt register capable of storing a plurality of logical interrupt signals and being capable of generating a succession of logical interrupt signals indicative of request for control of said bus and access to said microprocessor and memory, each said device capable of being remotely reset to a non-interrupt condition, and all of said plurality of devices delivering logical interrupt signals generated thereby through a common physical channel of said bus; and an interrupt controller coupled to said microprocessor and to said bus for recognizing delivery of an interrupt signal through said common physical channel of said bus and for periodically generating an interrupt reset signal and delivering such an interrupt reset signal to a selected on of said plurality of bus master devices for setting said register thereof to a condition indicative of no request for control of said bus.

* * * * *